Sept. 20, 1960   D. J. MUNROE   2,953,312
RECORDER-REPRODUCER
Original Filed March 4, 1949   12 Sheets-Sheet 1

Inventor
David J. Munroe
Mason, Kolehmainen, Rathburn & Wyss
Attorneys

Sept. 20, 1960 D. J. MUNROE 2,953,312
RECORDER-REPRODUCER
Original Filed March 4, 1949 12 Sheets-Sheet 4

Inventor
David J. Munroe
By
Mason, Kolehmainen, Rathburn & Wyss
Attorneys

Sept. 20, 1960

D. J. MUNROE 2,953,312

RECORDER-REPRODUCER

Original Filed March 4, 1949

Inventor:
David J. Munroe
By
Mason, Kolehmainen, Rathburn & Wyss
Attorneys

Sept. 20, 1960  D. J. MUNROE  2,953,312
RECORDER-REPRODUCER
Original Filed March 4, 1949  12 Sheets-Sheet 6

Inventor:
David J. Munroe
By
Mason, Kolehmainen, Rathburn & Wyss
Attorneys

Sept. 20, 1960     D. J. MUNROE     2,953,312
RECORDER-REPRODUCER
Original Filed March 4, 1949     12 Sheets-Sheet 10
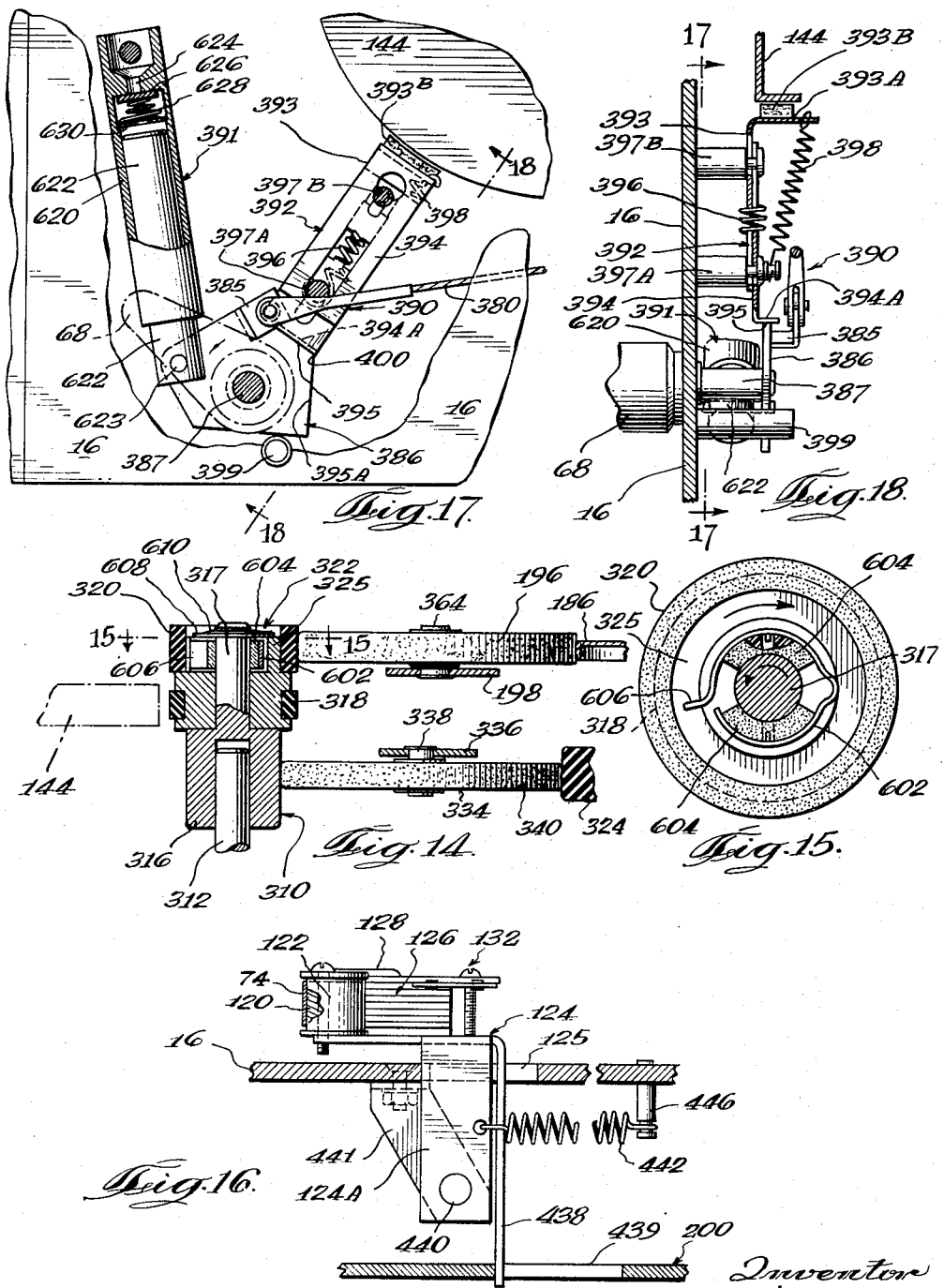

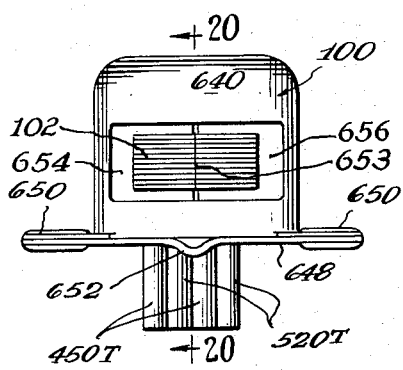
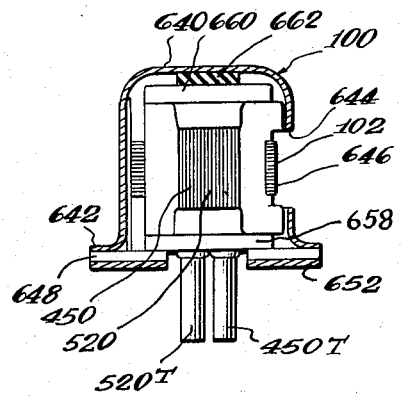
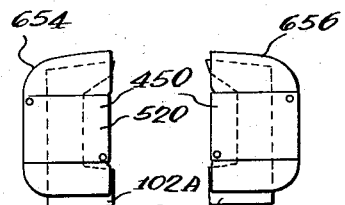
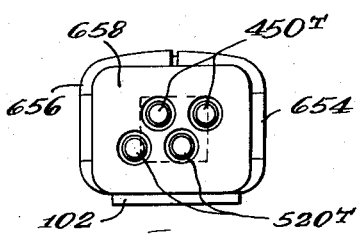
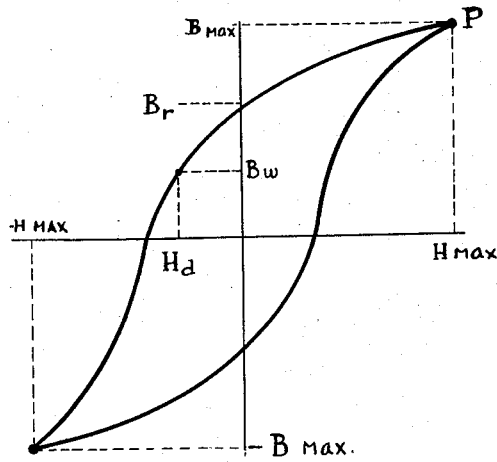

Sept. 20, 1960 D. J. MUNROE 2,953,312
RECORDER-REPRODUCER
Original Filed March 4, 1949 12 Sheets-Sheet 12

Inventor
David J. Munroe
By
Mason, Kolehmainen,
Rathburn & Wyss
Attorneys

United States Patent Office 2,953,312
Patented Sept. 20, 1960

2,953,312

RECORDER-REPRODUCER

David J. Munroe, Racine, Wis., assignor to Webster Electric Company, Racine, Wis., a corporation of Delaware Continuation of application Ser. No. 79,663, Mar. 4, 1949. This application Feb. 4, 1954, Ser. No. 408,235

11 Claims. (Cl. 242—55.12)

The present invention relates to a recorder-reproducer and component parts thereof and has for its primary object the provision of a new and improved apparatus of this character. This application is a continuation of application Serial No. 79,663 filed March 4, 1949.

Considerable work has been done in recent years to improve recorders and reproducers, especially of the magnetic type, and many improvements have been made. Despite these, the apparatus has remained relatively cumbersome and complicated, and has not been widely accepted as it might be because of operational difficulties and the lack of certain advantageous features. Generally, the devices included complicated and expensive mechanisms that are likely to get out of order. The controls are complicated and such that, unless extreme caution is exercised, improper operation results.

The present invention has for its object to provide a new and improved recording and/or reproducing apparatus provided with a control making it substantially foolproof in operation. This control is characterized by a single control easily operable into selected positions in which the apparatus is conditioned for desired operation.

A further object of the present invention is the provision of a new and improved recording and/or reproducing apparatus in which it is impossible accidentally to condition the apparatus so that it will erase a previous recording, as in the process of making a recording, at which time the record medium is "erased" so as to remove all traces of the past history of the tape. Accidental erasure is prevented by control apparatus requiring the user of the machine to go through a thought step followed by a mechanical one different from a usual selecting step before the apparatus can be conditioned to erase.

Another object of the present invention is the provision of a new and improved recorder-reproducer characterized by a uni-control for conditioning the apparatus for a number of operations including, at least, recording and reproduction and an interlock mechanism preventing the operation of the uni-control to its recording position unless the interlock is operated.

One of the disadvantages of known apparatus is that it is difficult and time consuming to locate a particular portion of the record medium, which may be a wire or tape, especially if that portion is near or back of the center of the tape. Another object of the present invention is the provision of a new and improved apparatus in which this disadvantage is eliminated by providing the apparatus with a "high speed forward" enabling the medium to be moved at high speed in the ordinary "record" or "reproduce" direction.

Another object of the present invention is to provide a new and improved apparatus having a fast forward speed characterized in that it also includes supply spool braking means operative to prevent overrun of the supply spool when the fast forward operation is terminated. This arrangement prevents the inertia of the supply spool from running it at high speed and spewing out an undesired amount of tape.

Another object of the present invention is the provision of a new and improved apparatus characterized by a high forward speed and a control for conditioning the apparatus for its several operations so constructed and arranged that it can be operated at the high forward speed only when the control is in a predetermined one of its positions, preferably its "listen" position.

A still further object of the invention is the provision of a new and improved recording and/or reproducing apparatus characterized by a selectively movable control member called, for convenience, an index plate supporting a number of component parts of the apparatus, including a driving motor and control elements co-operating with other component parts mounted upon a base plate upon which the index plate is also movably mounted.

Another object of the invention is the provision of a new and improved apparatus characterized by its compact arrangement of operating and control elements, both mechanical and electrical.

Other objects and advantages of the present invention will become apparent from the ensuing description of an illustrative embodiment thereof, in the course of which reference is had to the accompanying drawings, in which:

Fig. 8A is a fragmentary cross sectional view along the line 8A—8A of Fig. 8;

Fig. 10 is an enlarged cross sectional view taken along the line 10—10 of Figs. 1 and 4;

Fig. 11 is an enlarged cross sectional view taken along the line 11—11 of Figs. 1 and 6;

Fig. 12 is an enlarged cross sectional view taken along the line 12—12 of Fig. 4;

Fig. 13 is a horizontal cross sectional view, partly broken away, taken along the line 13—13 of Fig. 12;

Fig. 14 is a fragmentary axial cross sectional view through the motor shaft and driving pulleys with the apparatus in high forward speed condition, it being taken along the line 14—14 of Fig. 8;

Fig. 15 is a horizontal cross sectional view taken along the line 15—15 of Fig. 14 and illustrating details of a clutch in the high forward speed drive;

Fig. 16 is a vertical cross sectional view taken along the line 16—16 of Fig. 7, illustrating details of the erase head;

Fig. 17 is a top plan view, partly broken away, of a portion of the fast forward speed control mechanism and illustrating particularly details of the supply spool brake, the brake being shown in its off position—the view being taken along the line 17—17 of Fig. 18.

Fig. 18 is a cross sectional view taken along the line 18—18 of Figs. 1 and 17;

Fig. 19 is a front elevational view of the record-reproduce head;

Fig. 20 is a side elevational view of the head, core and coil assembly, with the cover shown in section along the line 20—20 of Fig. 19;

Fig. 21 is a bottom plan view of the core and coil assembly;

Fig. 22 is an exploded view illustrating the two-part coil and core construction of the head;

Fig. 23 is a graph used in explanation of the tape conditioning method; and

The apparatus of the present invention may be utilized with various types of record media. It is particularly designed for use with an elongated magnetizable record medium such as a tape coated or impregnated with magnetic material. The apparatus includes a recording device for varying the condition of the medium or tape in accordance with intelligence, the recording device imparting a controlled degree of the condition to an incremental length of the medium in accordance with time variations in said intelligence.

The apparatus of the present invention is characterized among other things, by the ease with which it may be operated into its various positions and the safeguards which are provided to prevent accidental operation thereof into a position in which the record upon the medium might be destroyed. In brief, the control may be operated into a number of distinct and selective positions in which the apparatus is conditioned for (1) recording, (2) reproducing or listening, (3) rewinding, (4) fast speed forward, and (5) a stop position. The control includes a selector knob mounted at a readily accessible position of the apparatus, preferably upon a base plate carrying also the major mechanical components of the apparatus, as will now be brought out in connection with the drawings.

Figure 1:
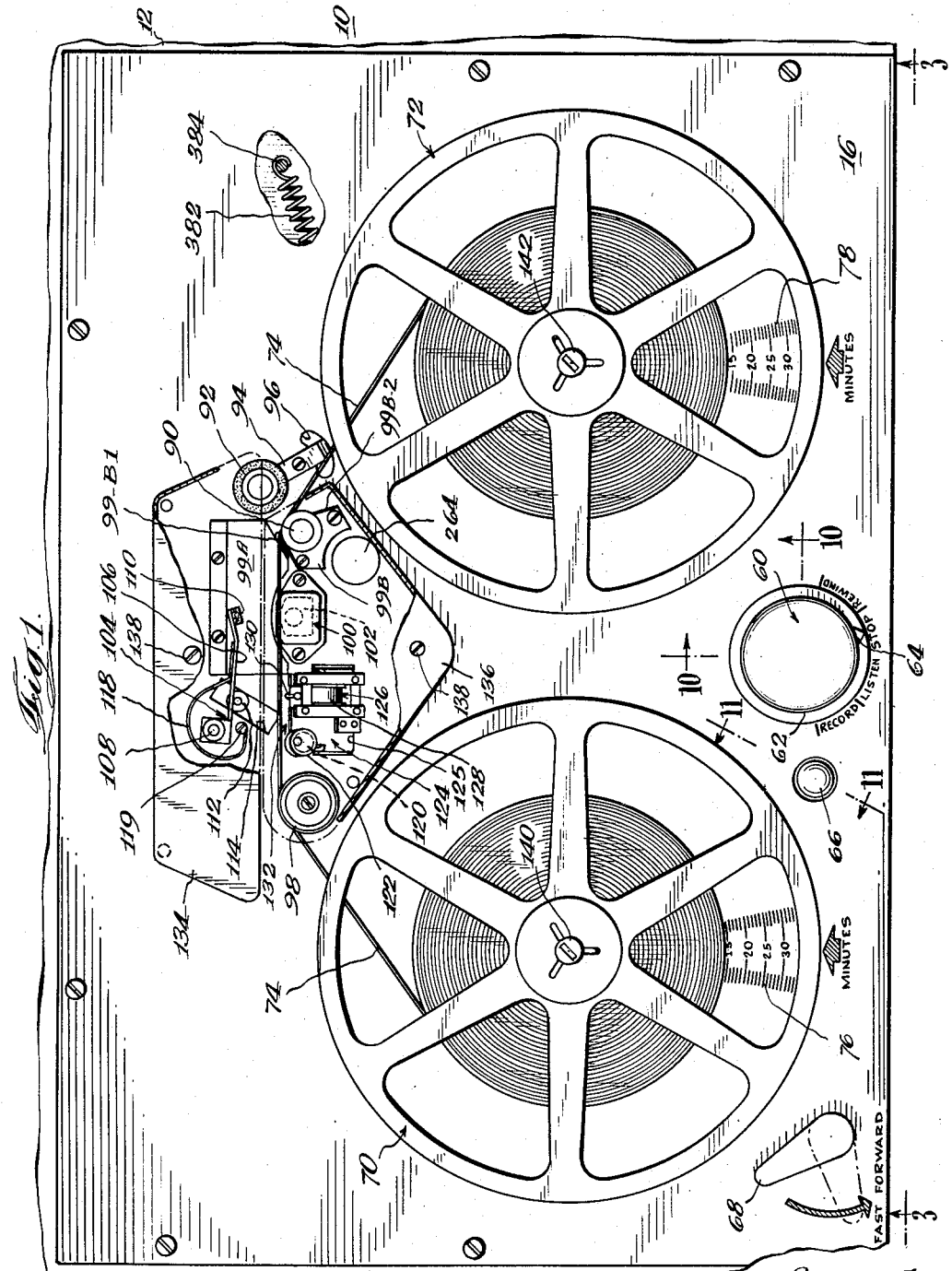
Fig. 1 is a fragmentary top elevational view, partly broken away, of a recorder-reproducer constructed in accordance with the present invention; in the view the apparatus is illustrated in its stop position, with the recording and erase head cover partly removed and without the cabinet and front plate.
Figure 2:
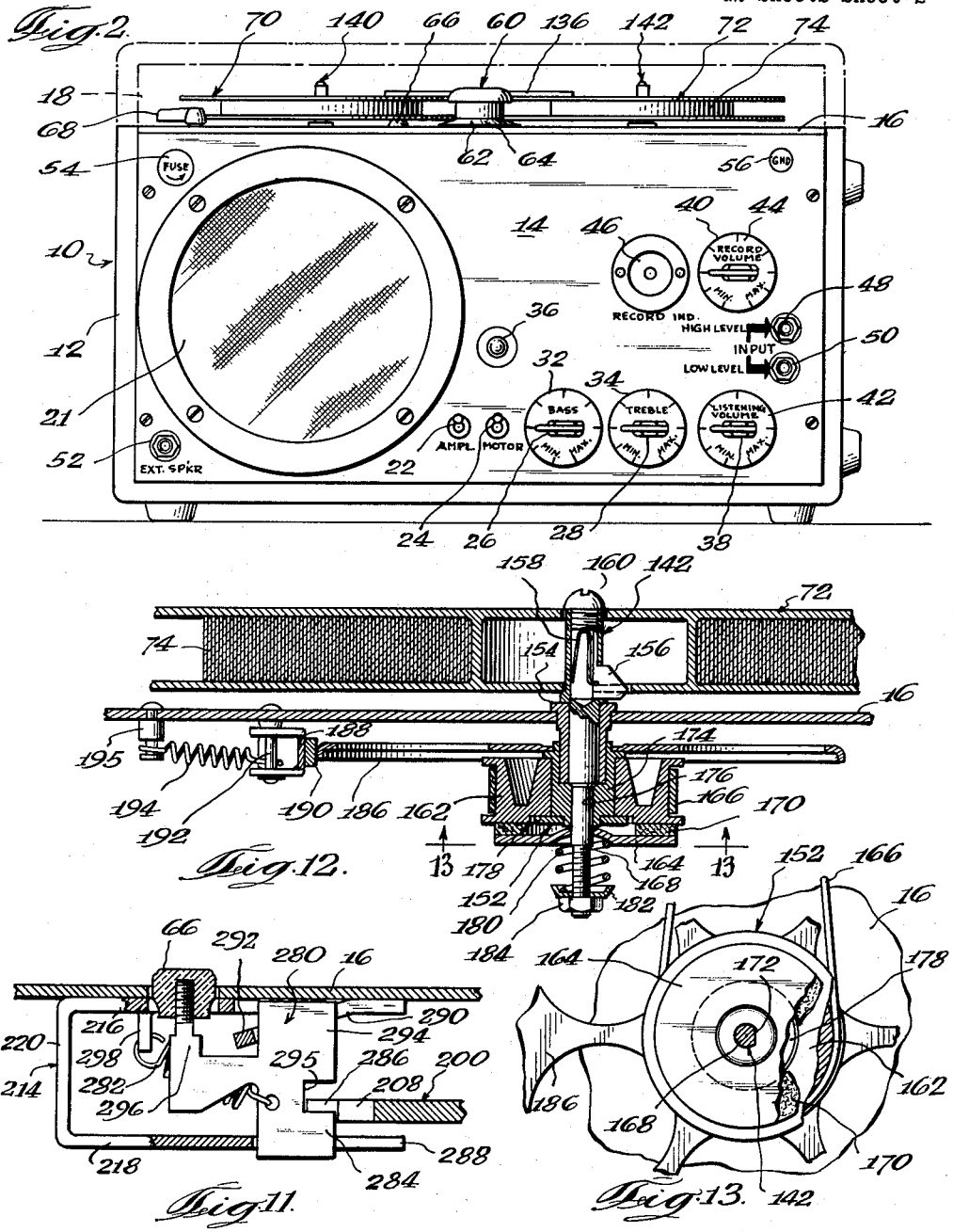
Fig. 2 is a front elevational view of the apparatus, with the cover shown in phantom.

Referring first particularly to Figs. 1 and 2, the apparatus, which is shown as a recorder-reproducer, is indicated as a whole by reference character 10. It includes a suitable cabinet 12 having a front panel 14, a top panel or base plate 16, and may be provided with a top cover 18, shown in phantom in Fig. 2, and a front cover, which has not been shown.

Most of the component parts of the apparatus are located inside of the cabinet. Among the parts so located are the power supply and amplifying means illustrated diagrammatically in Fig. 24. Also located within the cabinet is a loud-speaker 20, which is mounted on the front panel 14 immediately behind a screened opening 21.

A number of controls and input jacks are mounted upon the front panel. The controls include an on-off switch 22 for the amplifier, a similar switch 24 for a motor, a bass control 26, and a treble control 28. The bass and treble controls have suitable dials 32 and 34 associated therewith. A pilot lamp 36 may be provided to indicate closure of the switch 22. The recorder is characterized also by separate amplifier channels for the loud speaker and the recording means. These channels have independent gain controls associated with them and which are mounted upon the front panel. The gain control for the loud speaker, which controls the listening volume is indicated by the reference character 38 and the gain control for controlling the recording volume is indicated by the reference character 40. These two controls have associated dials 42 and 44 associated therewith. The recording channel also has associated with it a recording indicator 46, which may be an "electric eye." Two input jacks are provided, one indicated by reference character 48, for a high level input source, and a second, 50, for a low level input source. Another jack 52 is provided for connecting an external speaker and disconnecting the speaker 20. A removable fuse 54 and ground terminal 56 are also located on the front panel.

In accordance with one of the features of the present invention, the apparatus is provided with a single control for conditioning the apparatus for recording, reproducing and rewinding. This control has associated with it a mechanical interlock for preventing operation of the control into its record position so that the apparatus cannot be conditioned for recording, which is accompanied by erasing, unless the operator goes through both a thought process and mechanical operation. The apparatus is also characterized by a fast forward speed enabling a particular intermediate portion of the record medium quickly to be located and then reproduced. This fast forward speed is characterized by a control correlated with the main control so that the fast forward speed can be obtained only when the apparatus is in its listen position.

Referring now more particularly to Fig. 1, it may be noted that the control for conditioning the apparatus for recording, listening and rewinding includes a knob 60 adapted readily to be grasped by the operator and rotated into its various positions. The knob is located near the center and at the front of the base plate so that its position can be readily noted and so that it can be easily operated. In order readily to indicate the position of the knob, it is provided with an enlarged lower skirt-like portion 62 upon which is formed an arrow-like pointer 64 cooperating with suitable indicia printed or otherwise suitably formed on the base plate to indicate the four referred to positions. In Fig. 1, the recorder is illustrated in its stop position.

The means for preventing the accidental conditioning of the apparatus for recording includes a mechanical interlock, to be described hereinafter, comprising a push button 66 extending above the base plate (see particularly Figs. 2 and 11), which, when depressed, enables the control knob 60 to be moved to its record position.

The apparatus can be conditioned for fast forward speed upon movement of a control lever 68 from its indicated solid line position to the phantom line position. As already indicated, this movement can be effected only when the control knob 60 is in its listen position.

The record medium is supported above the base plate and preferably but not necessarily in transparent reels mounted above a suitably marked portion of the base plate so as to enable the operator of the recorder readily and immediately to observe the length of tape upon both the supply and take-up reels, the length preferably being indicated by the playing or recording time in minutes.

Referring again more particularly to Fig. 1, the supply reel is indicated by the reference character 70 and the take-up reel by the reference character 72. The two reels may be identical in construction and may be made of some suitable transparent plastic material, such as Lucite. In Fig. 1, the record medium, indicated by reference character 74, is shown partly upon the supply reel and partly upon the take-up reel. The reels may be of suitable size, those illustrated being adapted to hold about 1,250 feet of record medium, which may be and is shown as being a coated paper tape. The base plate is provided with suitable scales 76 and 78 at locations immediately beneath the reels 70 and 72, respectively, showing at a glance the length of tape, as measured in playing or recording time, upon each reel. The supply reel 70 is shown as having about 600 feet of tape, and the take-up reel about 650 feet. The scales 76 and 78 are identical and include time markings running from 1 to 30 minutes. These main graduations are sub-divided in suitable manner to enable the operator easily to note the number of minutes.

Also located at the top of the plate 16 are some other parts of the apparatus which will be but briefly described at this point. These include tape driving and guiding means, tape conditioning (erasing means) and recording and reproducing means.

The tape driving means includes a continuously rotating metallic capstan 90 rotated at constant speed, and an associated rubber tired pinch roller 92 adapted to hold the tape against the capstan so that the tape will be properly driven thereby. The pinch roller is mounted at the end of a lever 94 extending below the base plate 16 through an aperture 96 and adapted to be moved into and out of operating position, as will be described hereinafter.

The tape is guided by a guide wheel 98, mounted for rotation above the base plate, a relatively large thin tape supporting plate 99A raised a short distance above and secured to the base plate, and a guiding element 99B associated with the capstan. Element 99B includes vertically spaced fingers 99B–1 between which the tape runs and a vertical plate 99B–2 which acts as a doctor or stripper blade.

The capstan and guide wheel are located in spaced apart relation, the two being positioned near the take-up and supply spools, respectively, thereby to provide a space between them for tape conditioning and recording and reproducing apparatus. The latter includes a transducer in the form of a recording and reproducing head 100 fixedly mounted above the base plate so that its associated magnetic core 102 (see Figs. 19 to 21) is located substantially in line with the coated side of the tape, this being the front side of the tape as it is shown in Fig. 1.

In order better to hold the tape against the recording and reproducing head, there is provided a movable pressure pad assembly 104 comprising a lever 106 pivotally mounted above the base plate as upon a vertical pin 108 and having a pad 110 at one of its ends adapted to be forced against the tape and thereby to hold the tape against the head 100. The pad may be made of suitable material, such as felt. The position of the pressure pad is controlled in a manner to be described hereinafter by a pin 112 extending through an aperture 114 in the base plate and an associated curved leaf spring 118 curving around the pivotal end of the lever and secured to the back of an intermediate portion of the lever and to a post 119 near pin 108.

The tape conditioning means, which forms one of the features of the present invention and which will be described in greater detail hereinafter, includes two tape conditioning devices. The first of these, first in that it acts upon the unconditioned tape before the other, is a permanent magnet 120 mounted within a plastic cover 122 and supported upon an erase head lever 124 extending above the top of the base plate through an aperture 125 in the plate. The second of the conditioning means is an alternating current erasing means including a transformer 126 also mounted upon the lever 124. The transformer includes a primary winding 128 and a single turn secondary 130 of which the former is supplied with a high frequency alternating current, as will be described in greater detail hereinafter. The lever 124 is moved, as will be described in detail hereinafter, between operative and inoperative positions. In the operative position, into which it is moved only in the record position of the control knob 60, the two magnetic means, which for convenience will be referred to as an erase head and indicated as a whole by reference character 132, are moved to be close to and to bear lightly against the tape 74.

The two heads, i.e., the recording and reproducing head and the erase head 132, as well as the pressure pad assembly, are normally enclosed by a cover comprising the two parts 134 and 136. They are detachably secured to the base plate as by the screws 138.

Returning again to the tape supply and take-up reels 70 and 72, these are mounted, respectively, upon shafts 140 and 142 projecting above the base plate. The shaft 140 is journaled in a suitable bearing 141, see Fig. 3, in the base plate and it has attached to it below the base plate a drive pulley 144 (used in rewinding) and a brake drum 148, see Fig. 4. The pulley and brake drive may well be constructed as two cup-like structures secured back to back. The tape supply reel is detachably mounted upon the shaft 140 in the same manner as the supply spool, as will be described shortly. The supply spool, however, rotates in unison with its shaft 140, the pulley 144 and brake drum 148, which are fixedly secured to the shaft. The supply spool 70 has associated with it a supply spool brake 150, the construction and operation of which will be described shortly, the brake being adapted to brake the supply spool in all positions of the control knob, except in the rewind position. In the rewind position, the supply spool is driven through pulley 144 in order to rewind the tape thereon from the take-up spool. The spool is also braked for short time intervals when the high speed forward lever 68 is operated, as will be described later.

The take-up spool drive includes a take-up clutch indicated as a whole by reference character 152 and is best illustrated in Figs. 12 and 13, to which reference will now be had. Referring more particularly to Fig. 12, it will be noted that the take-up spool shaft 142 is journaled in a bearing 154 mounted in the base plate 16. The upper end of the shaft is hollowed and apertured to receive a reel catch 156 biased outwardly by a spring 158. The end of the shaft is closed by a cap screw 160.

The take-up spool clutch includes driving and driven members, these being a pulley 162 driven by a belt 166 and a drive washer 164 axially but not rotatably movable relative to the reduced diameter end portion 168 of the shaft 142. A felt washer 170 may be interposed between the pulley and washer. The connection between the drive washer and shaft 142 is preferably effected by providing the shaft portion 168 with a flat 172 (see Fig. 13) and providing the washer with a corresponding opening. The pulley is rotatably journaled upon a sleeve-like bearing 174, also having a splined connection with the shaft portion 168, as by providing the bearing with a flat 176 for cooperation with the flat 172 of the shaft portion. The pulley and bearing are held in assembled relation by a washer 178 staked to the lower end of the bearing. The clutch parts are held in assembled relation by a spring 180, a spring cup 182, and a lock nut 184 secured to the threaded lower end of the shaft 142. The spring, the tension of which is adjustable by the nut 184, forces the drive washer against the pulley or rather the felt washer 170.

The take-up spool shaft 142 also has a combined driving pulley and brake associated with it. It includes a combined driving pulley and brake drum 186 secured to the upper end of the pulley bearing 174 and a brake lever 188 having a drum engaging pad 190 at one end. The lever is pivotally secured underneath the base plate 16 as by a pin 192 secured to the base plate and it is biased toward braking position by a coiled spring 194 (see Figs. 4 to 8, inclusive, and 12) secured to the lever and a pin 195 secured to the underside of the base plate. At this point it is believed desirable, however, to state that the take-up spool brake is on in the stop position of the recorder, off in the rewind, the listen, the record and high forward positions.

The disc 186 is driven in the high forward position by an idler wheel 196 rotatably mounted upon a guide plate 198 when the latter is moved into driving position (see Fig. 8) in a manner to be described hereinafter.

The supply and take-up spools are, as heretofore indicated, both braked in the stop position of the apparatus. They are selectively driven and braked when the apparatus is conditioned for listening, recording, rewinding, or for fast forward speed. The control operations are, except for the fast forward speed, simply and readily performed by the single control knob 60, which is operatively connected to a novel control mechanism associated with the drive and braking means and also with a control switch controlling certain electrical connections, as will be set forth hereinafter.

The control by a single control knob is simplified and rendered advantageous by the novel mechanism which is characterized by an index plate, indicated generally by reference character 200, movable by the control knob and supporting a single motor, which is another feature of the invention, and a number of control elements. Not only does the control knob move the index plate 200 but it also operates a control switch assembly 202, not shown in full, but which may be of known ganged type and which is diagrammatically illustrated in Fig. 24. The construction utilizing a single index plate enables a single motor conveniently to be used and minimizes the number of parts required to perform the numerous functions necessary for apparatus having the operating advantages of that described.

The index plate is operatively connected to the control knob through an operating shaft 204 (see Fig. 10), to the upper end of which the knob 60 is secured, a gear 206 fixed for rotation with the shaft and meshing with gears 208 formed at one end of the index plate. The control knob is operatively connected to the switch 202 through the shaft 204, another gear 210 secured for rotation with the shaft and meshing with a gear 212, forming part of the switch assembly.

The control knob, its shaft, the gears 206 and 210 and the switch 202 are preferably constructed as an assembly unit, which can be readily secured to the base plate 16 prior to attachment of the control knob to the upper end of shaft 204. The assembly includes a generally U-shaped bracket 214 having spaced apart generaly horizontal upper and lower leg portions 216 and 218 and a bight 220. The gears 206 and 210 are secured in spaced relation to each other and a position detent wheel 222 having a series of detents 224 by a series of spaced apart pins 226, the gears and detent wheel being separated by the spacers 228 and 230. The spacer 230 is provided with a flattened opening cooperating with the flattened lower portion 204A of the shaft 204, thereby non-rotatably to secure the gears and detent wheel relative to the shaft. The gears and detent wheel are located between the horizontal leg portions of the bracket, the lowermost gear 206 bearing against a washer 232 located below it. The shaft, together with its assembled gears and detent wheel, is secured to the bracket by a C-washer 234 engaging the lower end of shaft 204 and bearing against a washer 236 interposed between it and the underside of leg 218 of the bracket.

The switch assembly 202 is preferably secured to and forms part of the control knob-pinion assembly. It includes a switch operating shaft 238 journaled in switch supporting structure 240 secured to an extension 242 of the lower leg 218 of the mounting bracket, as by a lock nut 244. The gear 212 is secured to the upper end of shaft 238 as by its hub 246. The gear 212 is located between the legs 216 and 218 of the mounting bracket so as to engage the control knob operated gear 210.

Figure 3:
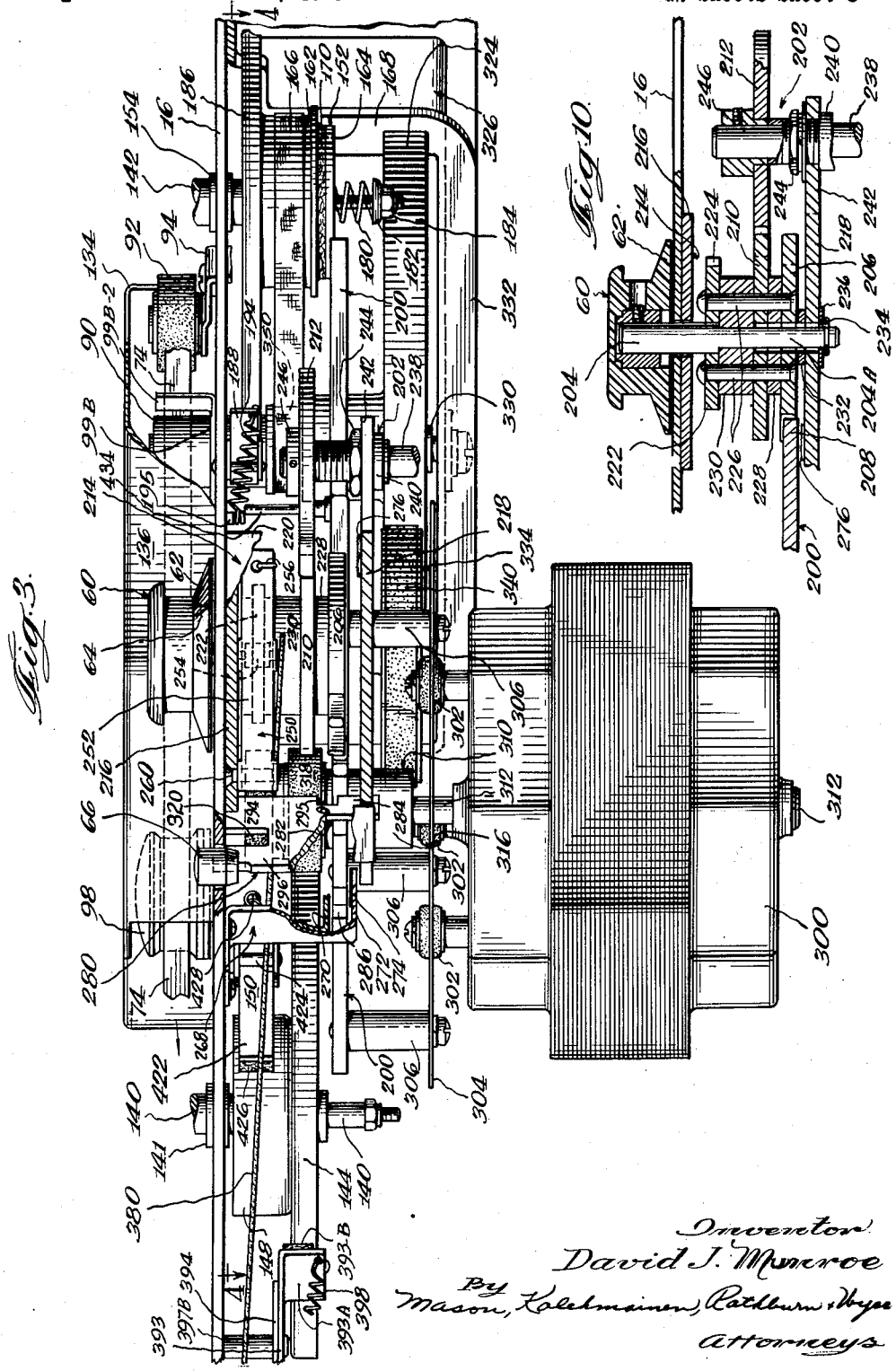
Fig. 3 is a front elevational view taken along the line 3—3 of Fig. 1 and illustrating an assembly comprising the base (or top) plate and most of the operating and selector mechanisms.
Figure 4:
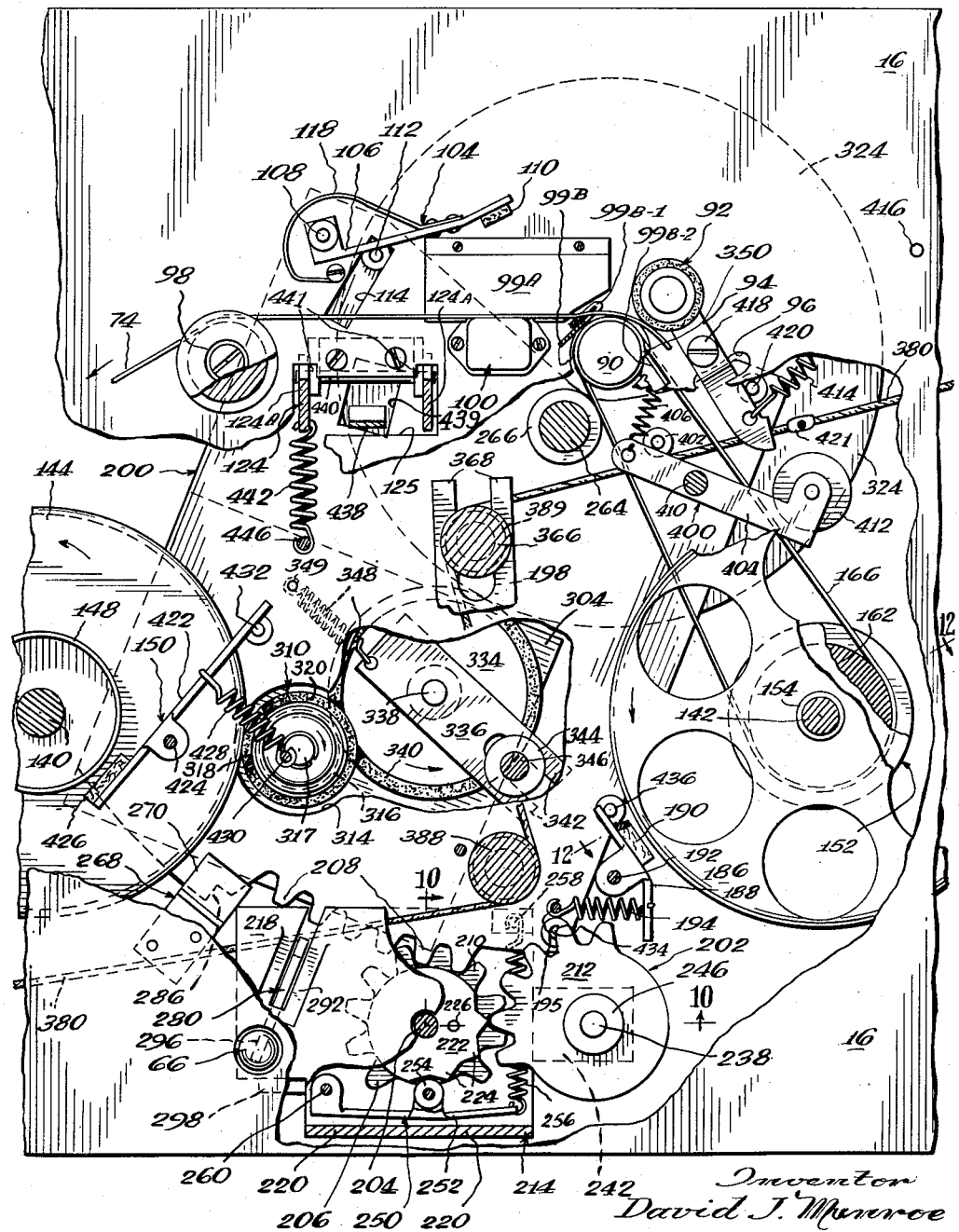
Fig. 4 is a horizontal cross sectional view taken along the line 4—4 of Fig. 3, certain of the parts being omitted or partly broken away in order better to illustrate other parts; in this view the apparatus is illustrated in its rewind position.
Figure 5:
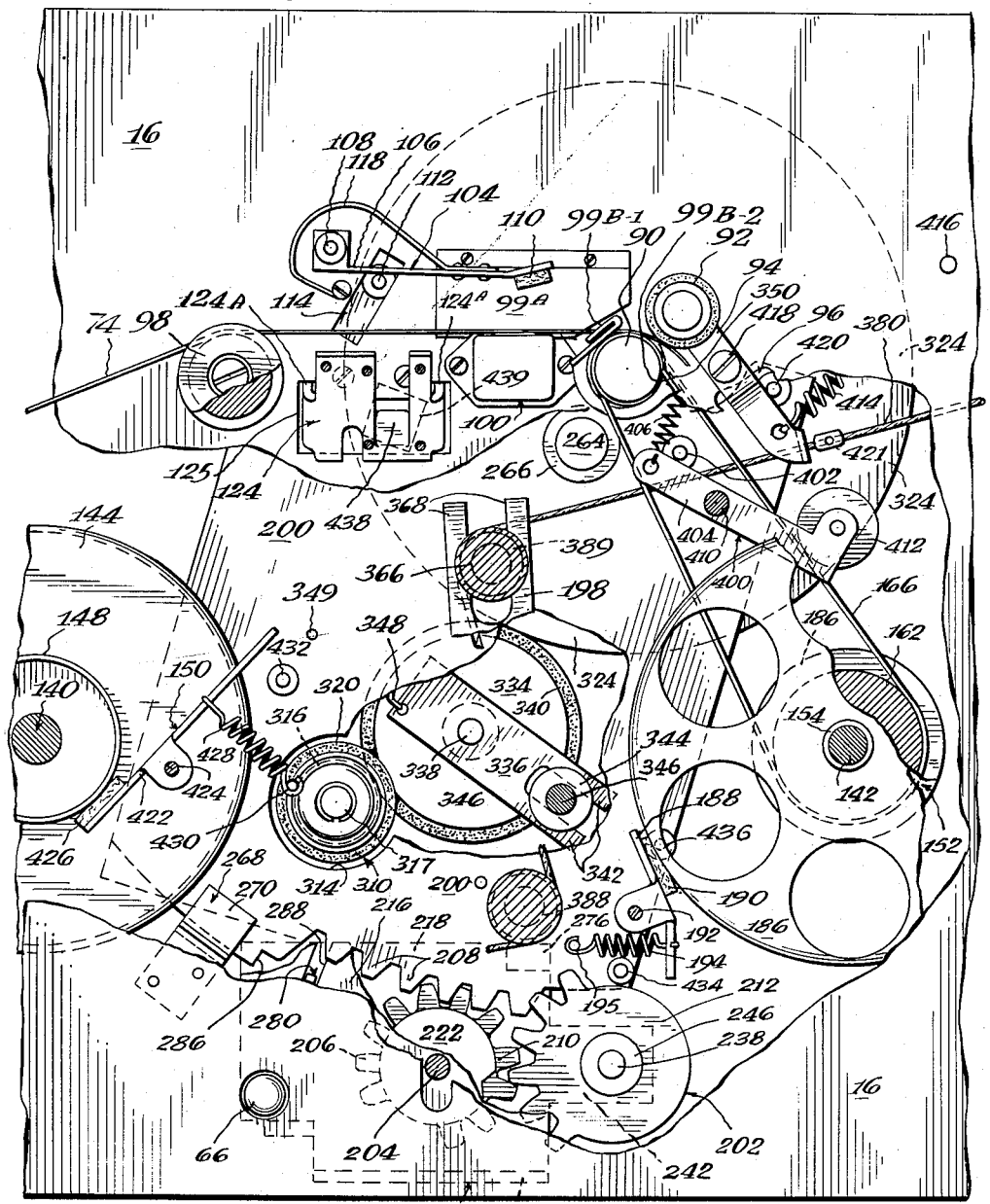
Fig. 5 is a view similar to Fig. 4 illustrating the apparatus in its stop position.

The index plate and the various mechanisms controlled by it are positioned and held against accidental displacement by a detent mechanism comprising the previously referred to detent plate 222 and a cooperating detent pawl 250. The pawl is also formed as part of the unit including the control knob-pinion and switch assembly. Referring now more particularly to Figs. 3 and 4, it may be noted that the detent pawl includes a lever 252 carrying a roller 254 intermediate its end and adapted to engage the generally triangular detent teeth 222. The roller is biased against the detent plate by a spring 256 secured to the free end of the lever 252 and having its opposite end secured to a pin 258 mounted in the upper mounting bracket arm 216. The pawl is pivotally movable about a holding pin 260 also suitably secured to the upper arm 216 of the mounting bracket.

The detent plate is so constructed and located that the various positions of the index plate and assocated parts are determined by the cooperative action of the roller and detent teeth, the roller being at the valleys between the teeth in the desired positions of the plate.

The index plate, which is somewhat rectangular in shape, is supported for pivotal movement below the base plate 16. The latter is provided with a pivot pin 264, see Fig. 1, which extends a short distance below the base plate. The index plate is provided with a bearing 266, suitably affixed to it, as by staking, adapted to receive the pin so that the index plate is easily angularly movable about the pivot pin.

The index plate is additionally supported and guided by the mounting bracket 214 and a guide 268 depending from the underside of the base plate and including spaced extensions or fingers 270 and 272 between which the end of the index plate opposite the pivoted end is received. Pieces of felt 274 and 276 may be placed on the upper sides of the lower finger 272 and leg 216 of the bracket to provide cushioned supports for the end of the index plate supported thereby.

The index plate is readily rotatable into its various positions, as determined by the detent mechanism, upon rotation of the control knob. One of the features of the present invention resides in the provision of means preventing accidential conditioning of the apparatus for recording. The reason for this is that when the apparatus is conditioned for recording, tape conditioning means (an erase head), is moved in proximity to the tape to remove from the tape its previous history of magnetization. Thus, whenever the apparatus is conditioned for recording, the tape is erased before a new record is placed upon it. According to the present invention an interlock mechanism is provided to prevent conditioning of the apparatus for recording unless the operator goes through the mental process of deciding that he wants to record and then goes through a subsequent mechanical operation. This mechanical operation, as previously indicated, requires the depression of an interlock button 66.

Figure 6:
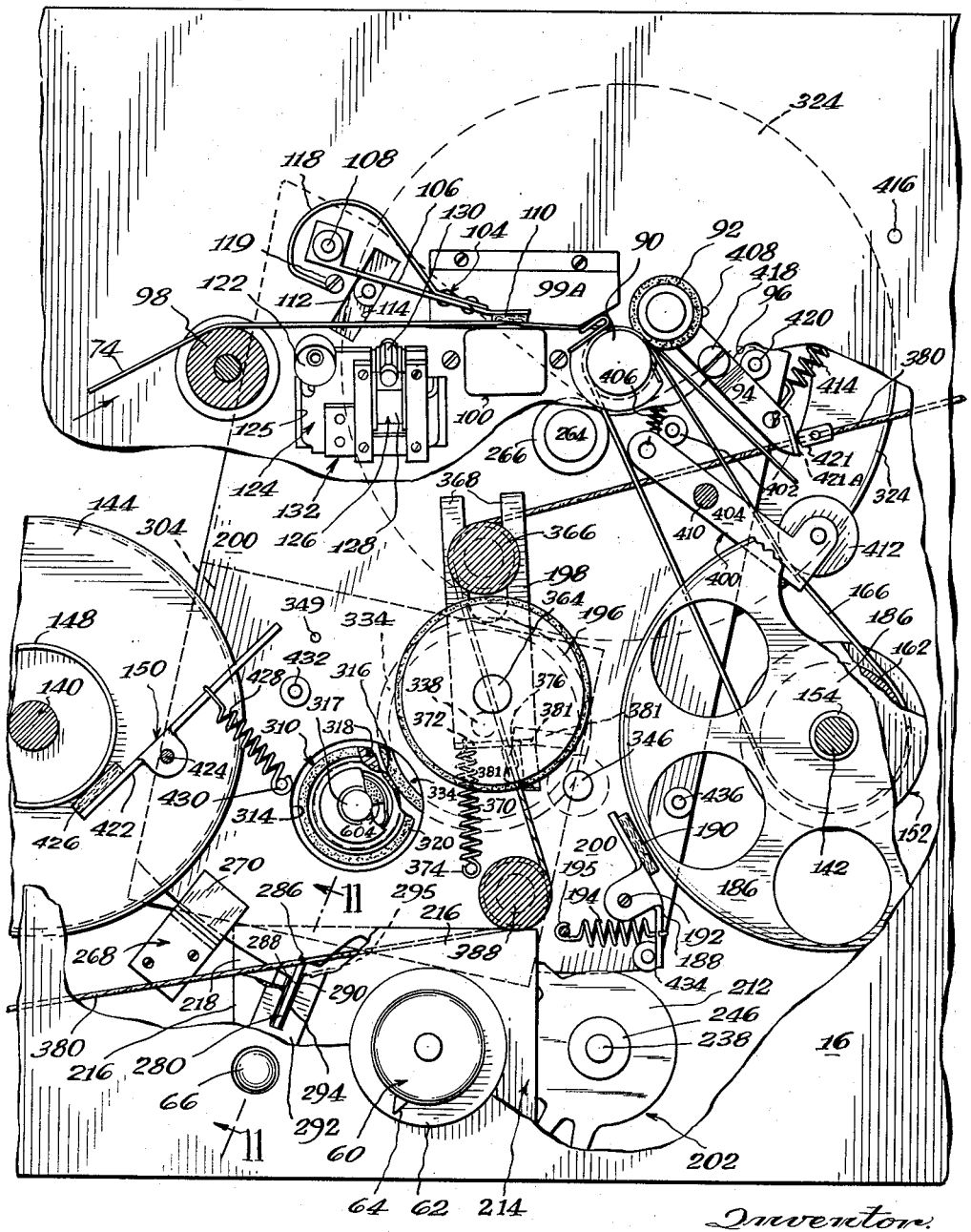
Fig. 6 is another view similar to Fig. 4, but illustrating the apparatus in its listen position.

In accordance with a further feature of the present invention, the mechanical interlock is formed as part of the assembly including the control knob, index plate, and switch assembly. Referring now more particularly to Figs. 6, 10 and 11, the construction and operation of the interlock mechanism will be described. The mechanism includes the operating button 66 and a lock plate, indicated as a whole by reference character 280, best illustrated in Fig. 10. The lock plate is biased upwardly by a spring 282 so that the latching portion 284 of the plate is in the plane of the index plate 200, where it is adapted to strike a shoulder 286 formed near the front end of the index plate, which is clearly illustrated in Figs. 6 and 7.

Referring now more particularly to Fig. 11, it may be noted that the lock plate 280 is supported by the mounting bracket 214 and guided for vertical movement by the upper and lower legs 216 and 218 of the bracket. The lower leg is provided with a slot 288 receiving the latch defining portion 284 of the lock plate. The upper leg 216 is provided with a slot 290, a portion of which is in a punched down portion 292 of the upper leg whereby adequate guiding is provided for the part of the lock plate 294 above the latch portion 284. The interlock push button 66 is mounted at the upper end of a laterally and upwardly extending part 296 of the lock plate. The biasing spring 282 is secured at one end to the vertically extending part of the lock plate and the other end is secured to a dependent finger 298 punched from the upper leg 216 of the mounting bracket.

The lock plate is held in uppermost position wherein it prevents movement of the index plate to its record position, except when the button 66 is depressed. It is in index plate movement preventing position in the listen position, as indicated in Fig. 6, wherein the latching portion 284 substantially abuts against a shoulder 286 of the index plate. Movement of the plate is thus prevented by the interlock until such time as the button 66 is depressed to lower the latching portion 284 below the index plate, thus enabling the index plate to ride in the slot 295 located between the lock plate portions 284 and 294. After the lock plate has been depressed and the control knob 60 rotated, the lock plate is held in its depressed position by the index plate, the outer portion of which rides on the latching portion 284, see Fig. 7.

In accordance with another feature of the present invention, the controls and the driving motor are mounted upon and move with the index plate. The driving motor 300 which may be a 110-volt, alternating current, synchronous motor, is secured as by rubber grommets 302 to a mounting plate 304, which is secured to the underside of the index plate by means including spacers 306.

The motor drives a driving wheel assembly 310 fixedly secured to the motor shaft 312 and best illustrated in Figs. 3 and 14. The shaft extends upwardly through a suitable aperture in the mounting plate 304 and the wheel assembly is secured to the projecting end of the shaft. The wheel assembly in turn projects upwardly through an aperture 314 in the index plate so that portions of the driving wheel assembly are located both above and below the index plate.

The wheel assembly includes means for continually driving the capstan 90 and selectively driving the take-up and supply spools, as will be described in detail shortly. At present it is desired to note that the capstan is driven through a metallic friction driving wheel 316 fixedly secured to the shaft and having a reduced diameter upper extension 317. The supply reel is driven, in rewind operation only, by a rubber tired friction wheel 318 and the take-up reel is driven, in high speed forward operation only, by a metallic friction wheel 320, these two wheels being rotatably supported upon the extension 317 of wheel 316 and being operatively connected to the extension and thus to the motor shaft by a friction clutch 322, best illustrated in Fig. 15. Wheel 320 is actually fixedly secured to an upwardly facing hollow extension 325 of wheel 318.

The clutch is so constructed and arranged that it slips when the driving wheel 318 or 320 is initially made effective, thereby to prevent sudden application of additional load upon and possible stalling of the motor. It may thus be considered to be a "deenergizing" slip clutch. The clutch includes, in the main, a spring 602 and a pair of arcuate friction elements 604, held against the extension 317 by the spring. The spring and pads are mounted inside the hollow extension 325, the end 606 of the spring being secured to the extension, while the other end is free. The spring is so constructed and the portion 317 rotated in such a direction (counterclockwise, view from the top) that the clutch slips when load is suddenly increased but drives without any substantial slippage when the driven elements have started. The slippage ordinarily occurs only momentarily but it does serve to prevent the motor from stalling.

The clutch elements are held in place by a plate 608 secured to the upper end of extension 317 by a C-washer 610.

The capstan is driven at a constant speed during the operation of the machine, i.e., whenever the motor is energized. The position of the capstan is fixed, whereas that of the motor is not and in view of this, a novel driving arrangement has been devised whereby the capstan is driven in the various positions of the index plate and motor.

The capstan 90 is constructed as an assembly unit with a fly-wheel 324. It is supported with its axis in vertical position by a generally U-shaped mounting bracket 326, suitably secured underneath the base plate as by screws 328. The fly-wheel and capstan assembly is rotatably supported upon a vertical shaft 330 secured to a bight 332 of the mounting bracket, see Figs. 3 and 8. A single ball thrust bearing, not shown, may be placed at the top of the shaft 330 for supporting the capstan-fly-wheel assembly for rotation with a minimum of friction.

The capstan-fly-wheel assembly is drivingly connected to the motor in all positions of the index plate. This is accomplished by an arrangement including an idler pulley 334 rotatably mounted upon a slidable and angularly movable idler guide plate 336. The pulley is journaled upon a shaft 338 secured to the idler plate and has a peripheral rubber tire 340 bearing against drive wheel 316. One end of the slide plate is longitudinally slotted to provide spaced fingers 342 slidably received in a grooved idler plate pivot 344 extending below the index plate and secured to the latter by a pin 346. The plate and idler pulley are biased so that the pulley bears at all times against both the driving wheel 316 and the outer periphery of the fly-wheel by a spring 348, one end of which is secured to the idler plate and the other to a post 349 secured to the index plate (see Fig. 4). As a result, the capstan 90 is rotated continuously by the motor whenever the latter is energized, no matter what position the index plate is in.

The take-up reel 72 is adapted to be driven in tape take-up direction by the capstan-fly-wheel assembly. This assembly has a pulley portion 350 located between the base and index plates and encircled by belt 166 (see Figs. 3 and 4). The belt has a length such that it does not drive the take-up reel unless tightened, which it is, as explained hereafter, in the record, listen and fast forward speeds.

The supply spool 70 is adapted to be rotated in the rewind position of the index plate by the rubber tired wheel 318 which engages the outer periphery of the supply spool pulley 144, as illustrated in Figs. 3 and 4.

Figure 8:
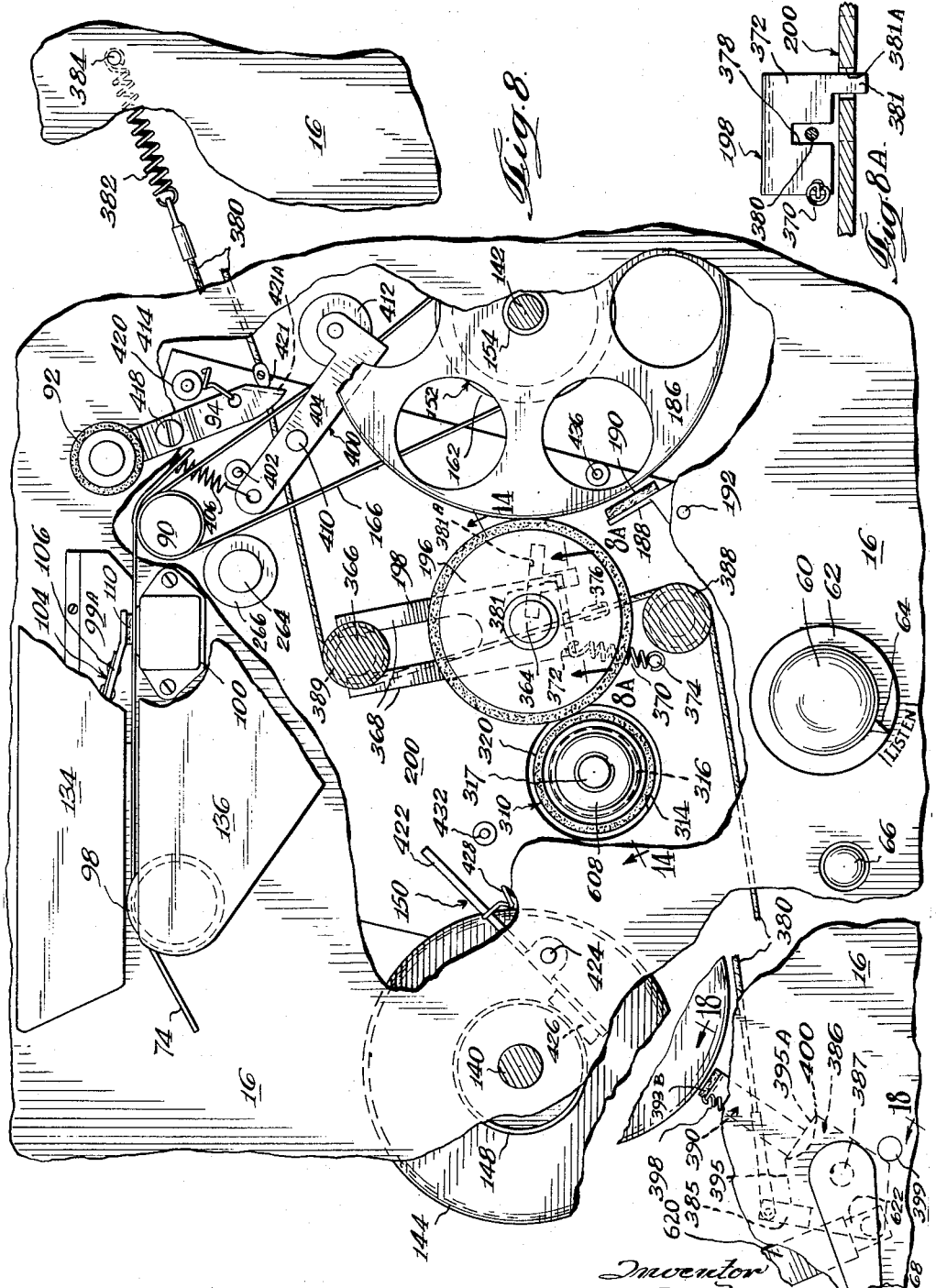
Fig. 8 is a view similar to Fig. 6, illustrating the apparatus conditioned for fast forward operation.
Figure 9:
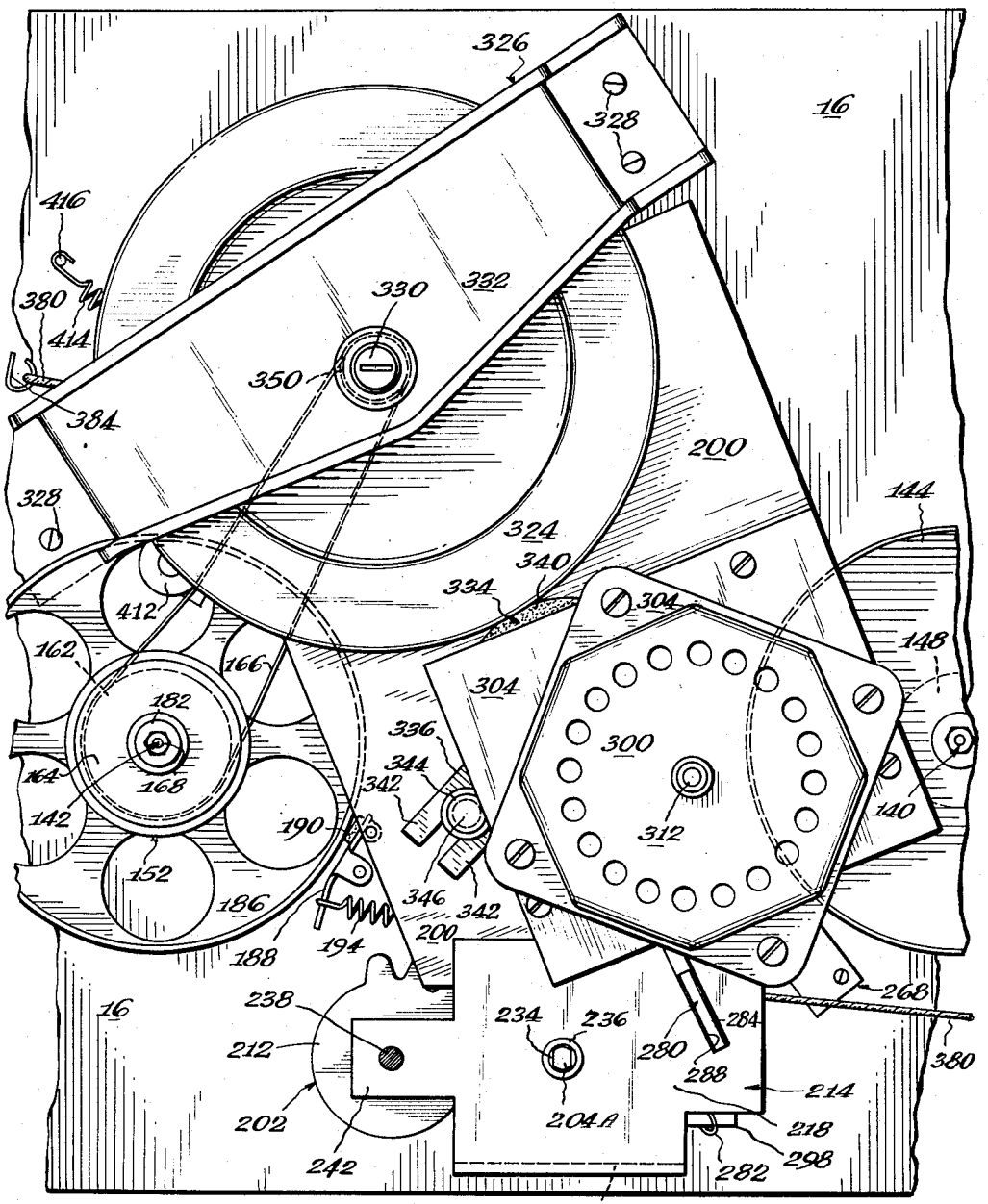
Fig. 9 is a fragmentary bottom plan view of the apparatus shown in Fig. 3.

In the fast forward speed the take-up spool is driven at high speed by the idler wheel 196 which serves drivingly to connect the driving wheel assembly tire 320 to the brake drum 186 of the take-up reel shaft 142, as illustrated in Fig. 8. Referring now more particularly to this figure, the idler wheel 196 is shown mounted upon the guide plate 198 by a shaft 364 affixed to the plate. The guiding plate 198 is pivotally and slidably mounted in a grooved pivot 366 mounted at the underside of the base plate 16 and which is received in a longitudinal slot at the back end of the guide plate defined by the fingers 368.

The high speed forward idler 196 and its guide plate 198 are biased by a spring 370 in a direction (toward the front of the recorder) in which the idler would be effective to interconnect driving wheel 320 and the take-up spool brake drum 186. One end of the spring is secured to a downturned end flange 372 of the guide plate and the other to a pin 374 secured to and depending below the base plate 16. Movement of the idler wheel is controlled by a stop 376 engageable by the flange 372, the latter having a downwardly facing slot 378 for the reception of a strand of stainless steel wire 380 to which the stop is fixed. The stop 376 is movable toward the front of the recorder by lever 68, but the idler wheel itself moves only when the control knob is in its listen position. At this time an extension 381 of the flange is aligned with the forwardly extending portion of a T-shaped slot 381A in the index plate so that plate 198 can be moved into the position shown in Fig. 8 by the spring 370 and thus bring the idler wheel 196 into contact with driving wheel 320 and brake drum 186.

When the lever 68 is released, it is returned to its normal position, as is the idler wheel 196, by a spring 382 secured to the end of the wire and to a pin 384 secured to the underside of the base plate. The opposite end of the wire is connected to an offset arm 385 of a supply reel brake controlling plate 386, which is fixedly secured to a shaft 387 rotably mounted in the base plate and to the upper end of which knob 68 is fixed. Between its ends the wire is guided by front and rear guide wheels 388 and 389 located substantially in line with guide plate 198 and secured to the underside of the base plate. Guide wheel 389 can conveniently be secured by the guide plate pivot 366.

The supply reel rotates at high speed in the high forward position, it being rotated through the tape, which is being wound at high speed upon the take-up reel. When the high forward speed is terminated by release of lever 68, the supply reel would continue its high speed rotation because of its inertia but, in accordance with another of the features of the present invention, this, and its resultant undesired feeding of tape, is prevented by a brake mechanism 390 which is effective briefly to brake the supply spool when the lever 68 returns to its normal position.

The brake 390 includes braking time determining means, such as the dashpot 391, and braking means in the form of an extensible arm 392. The extensible arm is of two-part construction. It includes a first lever 393, a downturned flange 393A carrying a friction pad (it may be felt) 393B, and a second lever 394 having a downturned flange 394A bearing against a flat 395 of plate 386 when the lever 68 is unoperated. The two levers are biased apart by a small spring 396 mounted in small openings in the two levers. The lever-spring assembly is mounted upon pins 397A and B mounted at the underside of the base plate and is biased toward and held against the plate 386 by a spring 398 secured to flange 393A and pin 397A. The construction and arrangement of the levers and springs is such that the brake is ineffective when lever 68 is unoperated and flange 394A against flat 395 of the plate 386. This position of the plate is determined by a stop pin 399. When the knob is turned to an intermediate position, a rise 400 on the plate 386 moves lever 394 toward pulley 144, spring 396 is compressed, spring 398 lengthened, and brake pad 393B forced against the disc. When the knob is turned to its limit, flat 395A bears against flange 394A and the brake is returned to an ineffective condition.

The return movement of the plate 386 and of the brake, and thus the effective braking time, is controlled by the dashpot 391. It comprises a cylinder 620 pivotally connected to the base plate and a piston 622 pivotally connected to the plate 386 by a pin 623. The cylinder has an air port 624 closed by a disc valve 626 held in closed position by a spring 628 held between the valve and a washer 630.

The piston is moved out from the cylinder by plate 386 when the control knob is moved to its fast forward position and moves in at slow speed when the knob is released and returns to its normal position at slow speed, thus rendering the brake effective for a short time when the rise 400 in plate 386 engages flange 394A.

As heretofore indicated, another of the features resides in the utilization of the index plate to effect various controls. Among these are the control of a belt tensioner 400 operative to tension belt 166 in the listen, record and fast forward positions; the pinch roller 92 which pinches the tape against the capstan in the listen and record positions (it being moved away from the capstan in the fast forward position by the wire 380 operated by knob 68); the pressure pad 104, which holds the tape against the record-reproduce head 100 in the same three positions; the take-up reel brake 188, which applies a braking force to the take-up spool in the stop position; the supply reel brake 150 which is effective to brake the supply reel in all positions except the rewind position; and the erase head 132 which is brought adjacent the tape in the record position.

The belt tensioner 400 is controlled by a pin 402 secured to and extending upwardly from the index plate and engaging a belt tensioner lever 404 held against the pin by a biasing spring 406, one end of which is secured to one end of the lever and the other to a post 408 mounted upon and extending below the base plate, see Fig. 6. The lever is pivotally mounted upon a shaft 410 secured to and extending below the base plate. A belt tightening idler pulley 412 is mounted at the end of the lever 404 opposite the spring and its is adapted to engage and tighten the belt 166 when the pin 402 is moved by the index plate into positions enabling the spring to force it against the belt. The pin is so located on the index plate that the spring 406 is able to move the roller against the belt enough to tighten the belt so as to effect driving of the take-up reel in the listen, record, and fast forward positions illustrated in Figs. 6, 7 and 8.

The pinch roller 92 is biased toward the capstan by a spring 414 secured at one end near the end of lever 94 opposite the roller and at its other end to a post 416 secured to and extending below the base plate 16. The lever is pivotally supported intermediate its ends by a pivot shaft 418. It will be recalled that the lever 94 includes a portion extending below the base plate through aperture 96. It is this portion to which the spring 414 is connected and which is also engaged by a pin 420 secured to and extending upwardly from the index plate 200. The pin is so located that it enables the spring 414 to move the pinch roller against the capstan in only the listen and record positions.

The pinch roller is moved away from the capstan during fast forward speed operation by an operating sleeve 421 secured to wire 380 and engageable with a slotted downturned flange 412A through which the wire passes, and as best shown in Fig. 8.

The pressure pad construction has already been described in some detail. At this point it is deemed sufficient to state that it is moved away from the record-playback head 100 by the pin 112 secured to and extending upwardly from the index plate into cooperative relationship with the pressure pad lever. When the index plate is moved to its stop and rewind positions, the pin 112 moves the pressure pad away from the record-playback head 100. In the listen and record positions the pressure pad is held against the tape and head 100 at a constant pressure determined by spring 118.

The supply spool brake 150 includes a lever 422 pivotally mounted underneath the base plate upon a shaft 424 secured to and extending below the base plate. One end of the lever is provided with a felt pad 426 movable into engagement with the brake disc 148. The pad carrying end of the lever is biased toward the brake disc by a spring 428 secured to the lever and to a post 430 secured to and extending beneath the base plate. The position of the lever is controlled by an operating pin 432 secured to and extending upwardly from the index plate and engageable with the end of the lever 422 opposite the brake pad. The pin is so located that the brake is released only in the rewind position of the control knob, see Fig. 4.

The take-up spool brake lever 188 is, as heretofore described, pivotally supported underneath the base plate by the shaft 192. The lever is biased by spring 194 so that the brake pad 190 is forced toward the disc 186. The position of the brake lever is controlled by pins 434 and 436, both mounted upon and extending upwardly from the index plate. Pin 436 cooperates with the pad carrying end of the brake lever, whereas pin 434 cooperates with the end to which the spring 194 is secured. The pins are so located that in the stop position the brake is effective, both pins being free of the lever; in the rewind position pin 436 engages the pad carrying end of the lever and frees the reel; and in the listen and record positions the brake is freed as a result of engagement of pin 434 with the spring end of lever 188 and resultant movement of the latter.

The erase head 132 includes the previously referred to lever 124. It has a downturned flange 438 extending underneath the base plate into cooperative relation with a slot 439 in the index plate 200, as best shown in Fig. 16. The lever is pivotally secured underneath the base plate by a horizontal shaft 440 secured to spaced supports 441 secured underneath the plate and passing through spaced mounting flanges 124A of the lever. The lever is biased into erasing position by a spring 442, so that the lever tends to turn in a direction such that the erase head moves toward the tape. The spring 442 is secured to one of the flanges 124A and to a post 446 secured to and extending beneath the base plate. The movement of the erase head is controlled by the index plate and slot 439, the latter being so located that the erase head is in effective position adjacent the tape only in the record position illustrated in Fig. 7.

The record-reproduce head is of novel construction, enabling it readily to be fabricated and assembled and also to be adjusted relative to the tape. It is important for good fidelity that the head be at right angles to the direction of travel of the tape and the head herein disclosed can readily be adjusted to this position. This head is also disclosed and claimed in my copending divisional application Serial No. 206,868, filed January 19, 1951.

The record-reproduce head is best illustrated in Figs. 1 and 19 to 22, inclusive, especially the latter, to which particular reference will now be had. The head is enclosed in a metallic container or can 640 having a generally outwardly extending rim 642 at its bottom and an opening 644 enabling the tape to run in close contact with the exposed face 646 of the core structure 102, which, incidentally, as may be noted from Fig. 22, includes the left and right hand core portions 102A and 102B. The core and coil assembly is substantially enclosed within the can 640 by a combined closure and mounting plate 648 secured to the cover as by the eyelets 650 and provided with a transverse downwardly extending ridge 652 of curved configuration about which the head can rock so that it can be adjusted and secured with the air gap 653 at right angles to the direction of movement of the tape, as by the securing screws illustrated in Fig. 1. The container and mounting plate also serve to shield the head from extraneous electrical disturbances.

The core and coil assembly is constructed in two parts which are subsequently assembled. The core comprises the two parts 102A and 102B, which may be made of magnetic laminations. The core portions are mounted within left and right polystyrene coil forms 654 and 656. The head includes two windings, one of which is used for reproduction and the other for recording. The coils are sectionalized, i.e., one portion of each coil is wound on each coil form and the two portions are connected in series. The electrical connections of the two coils will be described hereinafter in connection with the circuit diagram of Fig. 24. The record coil, which is indicated by the reference character 450, is connected to the terminals 450-T, while the reproduce coil 520 is connected to the terminals 520-T, these two sets of terminals being secured to a terminal plate 658. The core and coil assembly is held in assembled relation by the terminal plate 658 and a tie plate 660, the parts being held in assembled relation by suitable cement. A gum rubber pad 662 is placed between the tie plate and the underside of the cover top thereby to hold the core-coil assembly in the can in a cushioned manner.

Figure 24:
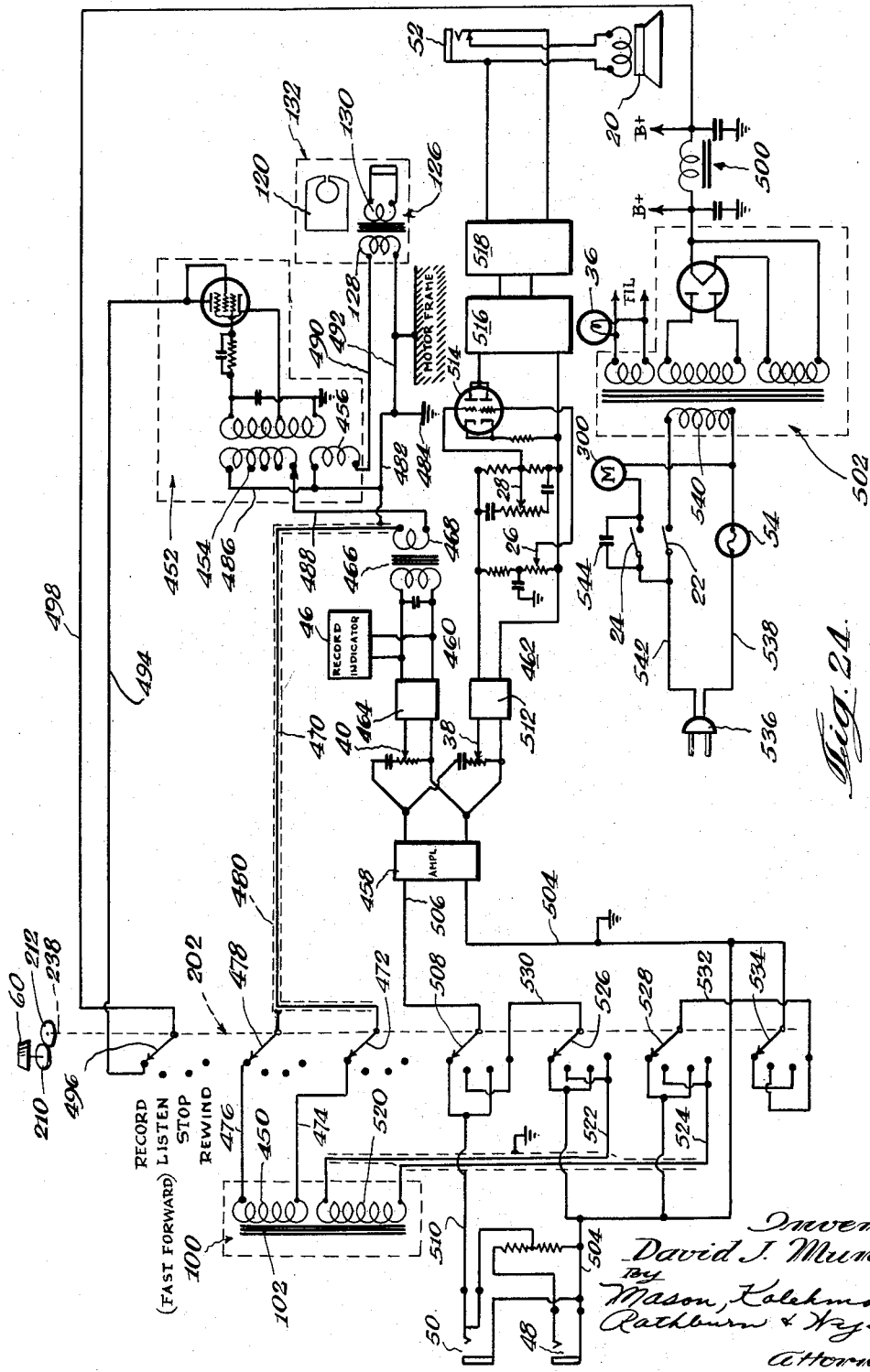
Fig. 24 is a schematic wiring diagram of the apparatus.

The electrical circuits and controls of the recorder are illustrated in Fig. 24 to which reference will now be had. The control is characterized by the switch assembly 202 operable by the control knob 60 which also operates the index plate. The selector switch is operable into four positions, the record, listen (also fast forward), stop, and rewind positions. The recorder includes separate recording and reproducing or playback channels, the latter of which is also utilized as a means for monitoring the recording.

Referring now to Fig. 24, it will be noted that the switch assembly 202 is illustrated in its record position. In this position the record coil 450 of the record-playback head 100 is supplied with the signal to be recorded and also with a high frequency constant amplitude signal from an oscillator 452, which may be of the Hartley type and have two output coils 454 and 456, the former of which supplies a high frequency current to the record head and the latter to the primary winding of the erase transformer 128. The record coil is also suplied with the input signal through an amplifier section 458, which is common to both the record and playback channels 460 and 462. The amplifier 458 is connected to the record channel through the record volume control 40. The latter is connected to an amplifier section 464, to the output of which is connected the record indicator 46. The output of the amplifier 464 is connected to transformer 466 and the secondary winding 468 of the latter is connected in series with the record coil 450 and the oscillator output coil 454. This series connection is effected through conductor 470, switch blade 472, conductor 474, the record coil 450, conductor 476, switch blade 478, the shield conductor 480, conductor 482, which is grounded at 484, conductor 486, the output coil 454 and conductor 488.

The erase head transformer primary winding 128 is connected to the oscillator output coil 456 permanently through a circuit including conductors 490 and 492, the latter of which may be connected, as shown, to the motor frame, which is grounded.

The oscillator is rendered operative only in the record position of the switch 202. In this position the plate circiut of the oscillator is completed through conductor 494, switch blade 496, and the plate voltage supply conductor 498 leading to a filter 500 connected to the output of a rectifier 502, which may be of conventional construction.

The erasing apparatus is thus rendered electrically effective by switching means and mechanically shifted adjacent the tape in the record position of the control knob. Accordingly both the permanent magnet 120 and the transformer 126 of the alternating current erase, act upon the tape and they, conjointly, provide a very effective tape conditioning means and one which is particularly suited for "high flux" tapes—i.e. tapes which have high retentivity. The method also enables a relatively small alternating current erasing means to be used and requires but little power.

The tape conditioning method which is disclosed and claimed in my copending application, Serial No. 231,502, filed June 14, 1951, Patent No. 2,688,663, granted September 7, 1954, comprises the steps of saturating the tape, decreasing the magnetization and then subjecting the tape to a high frequency alternating current magnetic field substantially to demagnetize it. The saturation and decrease in saturation are accomplished by moving the tape past a direct current magnet having a core with a narrow air gap providing a region of high intensity magnetization and pole pieces which recede from the path of tape movement. This can be conveniently done through the use of a magnet core that is substantially circular at its external periphery, such as the core 120 previously described. The tape passing past the magnet is magnetized sufficiently substantially to saturate it when it is in the region of the gap, as indicated by the point P on the graph of Fig. 23. At this point the magnetic coating of the tape is subjected to a magnetizing force $H_{max}$ producing flux of an intensity $B_{max}$. If the tape could be moved out of this field with no further influence from the magnet, the magnetic material would retain a peak residual magnetism represented by $B_r$. The tape, however, is gradually moved away from the gap and, at the same time, it moves away from the core. In so doing it is subjected to a demagnetizing force, which can be assumed to be $-H_b$, so that the coating on the tape is demagnetized to have a residual magnetism $B_w$ as it leaves the permanent magnet. The reduction is such that when the alternating current magnetic field acts on the tape, substantially all of the remaining previous magnetization is removed.

The foregoing tape conditioning method has been found very effective with "high flux" tapes, which cannot be satisfactorily conditioned by direct current or alternating current erasing methods. Also, alternating current erasing apparatus requiring less power can be used.

In the record position, the input of amplifier 458 is connected to both the high and low level jacks 48 and 50. This connection includes a grounded conductor 504 and conductor 506, switch blade 508 and conductor 510.

The playback channel 462, which is also used for monitoring during recording is connected to the output of amplifier 458 through the listening volume control 38.

primary winding upon closure of switch 22. The motor 300 is adapted to be connected across conductors 538, 542, upon closure of switch 24 and a condenser 544 may be connected across the terminals of switch 24.

The apparatus of the present invention is of such a character that it can be transported from one place to another in its cabinet 12, which can be provided with a suitable handle. In order to place it in operation, it can be supplied with power from a suitable source of alternating current to which the plug 536 can be connected. The cover 18 as well as a cover for the front panel are removable in order to render the various parts accessible to the user.

Ordinarily the control knob 60 is left in its stop position so that both the supply and take-up reels are braked by their respective brakes 150 and 188. The motor and amplifier switches 22 and 24 are also left open so that the apparatus is inoperative.

In order better to explain the operation of the apparatus there is included below a summary of the positions of the more important elements in the various operative conditions of the apparatus.

*Summary of operation*

| Component | Rewind | Stop | Listen | Record | High Speed Forward |
|---|---|---|---|---|---|
| Erase Head 132 | Off | Off | Off | On | Off. |
| Pressure Pad 104 | Off | Off | On | On | On. |
| Pinch Roller 92 | Off | Off | On | On | Off. |
| Supply Spool 70 | Driven in reverse by wheel 318. | Stopped | Driven by tape | Driven by tape | Driven by tape. |
| Supply Spool brake 150 | Off | On | On | On | On. |
| Supply Spool brake 390 (Fast Forward). | Off | Off | Off | Off | On briefly after high speed operation terminated. |
| Take-up Spool 72 | Driven in reverse by tape (Braked by friction clutch 152). | Stopped | Driven (belt 166 and clutch 152). | Driven (belt 166 and clutch 152). | Driven at high speed (Idler 196). |
| Take-up Spool brake 188 | Off | On | Off | Off | Off. |
| Take-up Spool Belt Tensioner 400 | Off | On | On | On | On. |

The latter is connected to an amplifier section 512. The bass and treble controls 26 and 28 are connected to the output of amplifier 512. The channel includes also a tube 514 of the dual triode type, an inverter-amplifier section 516, a push-pull output stage 518, to the output of which are connected the loud-speaker 20 and the external speaker jack 52.

In use, the recording volume is controlled through the use of the record indicator 46. The bass and treble controls are independent of the record control so that adjustment of them to provide a good loud-speaker output does not affect the recording.

In the listen position of the switch, the oscillator 452 is rendered inoperative, the record coil 450 is disconnected, and the playback or reproduce coil 520 is connected to the input of amplifier 458, which remains connected to the playback channel 462 and thus to the loudspeaker. The reproduce coil is connected to the amplifier input through the shielded conductors 522, 524, the switch blades 526 and 528, conductors 530 and 532, switch blades 508 and 534, and conductors 506 and 504, respectively.

In the stop position of the switch, both the record and playback coils are disconnected, the oscillator remains inoperative, and the amplifier input is connected to the input jacks.

In the rewind position, the record coil is disconnected, the oscillator is inoperative, and the playback coil 520 is connected to the input of the amplifier.

Power may be supplied to the recorder from the usual 110-volt power supply lines through a plug 536. One of the plug conductors 538 is connected through fuse 54 to the primary winding 540 of the power transformer associated with rectifier 502. The other conductor 542 is adapted to be connected to the other terminal of the In order to place the apparatus in operation, the switches 22 and 24 are closed in order to supply power to the electrical components and the driving motor 300. The latter, as heretofore described, continuously drives the capstan 90 through the driving wheel 316, the idler 334 and the flywheel 324. A reel of tape is placed upon the supply spool shaft 140 and threaded past the guide wheel 98, the record-reproduce head 100, the capstan 90, and the end fastened to the take-up spool 72. The narrow slot between the covers 134 and 136 facilitates correct threading of the tape and the tape is guided past the record head and capstan by the plate support 99A and the guiding structure 99B. In the stop position the erase head 132 is located a distance from the tape and is, therefore, ineffective; the pressure pad 104 is distant from the tape, the pinch roller 92 is moved away from the capstan, the supply spool 70 is braked by the brake 150, the take-up spool 72 is braked by its brake 188, and the belt tensioner 400 is so positioned that the belt is tensioned insufficiently to drive the take-up spool.

It is assumed that it is desired to make a recording, as of a conference. To do this a conveniently located microphone is connected to the low level input jack 50. If it is desired to record a radio program the audio output of a receiver may be connected through suitable means to the high level input 48. Before starting the apparatus the treble and bass controls may be moved to a desired position, which may be in the middle of their range, and the recording and listening volume controls may be moved to their minimum volume positions.

To make the recording, control knob 60 is operated to its record position. This requires both mental and mechanical operations, the mental one being a decision to record and the mechanical one being the depression of the interlock button 66, which, as heretofore described, must be depressed before the apparatus can be conditioned for recording. As a result it is substantially impossible for the user unintentionally to erase a previously record from a tape.

Figure 7:
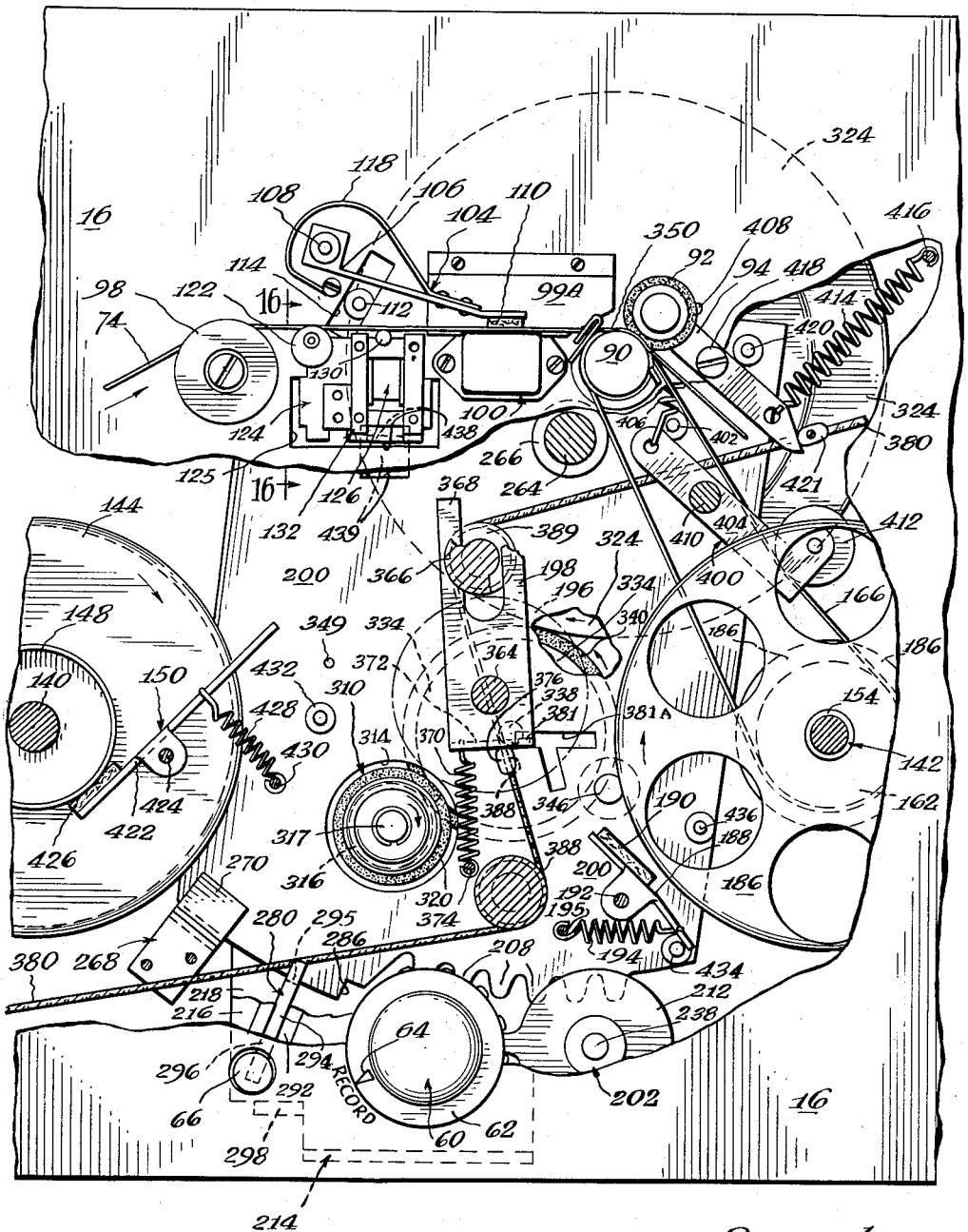
Fig. 7 is a view like that of Fig. 6 illustrating the apparatus in its record position.

The various elements are moved to the positions in which they are indicated in Fig. 7 and the circuit connections illustrated in Fig. 24 obtain. The pressure pad 104 holds the tape against the face of the record-reproduce head core 102; the pinch roller 92 holds the tape against the capstan 90 with the result that the tape is moved at a constant speed past the record head; the take-up spool brake is released and the spool is driven at a speed sufficiently high to take up the tape through mechanism including the capstan, belt 166 and clutch 152; the supply spool is driven through the tape and it is prevented from over-feeding by the brake 150 which is effective in the record position; and the erase head is moved into effective position thereby to erase, as previously described, the past record of magnetization of the tape and place it in condition whereby an eminently satisfactory record may be produced on it.

The signal, i.e., the conference record, is supplied to the amplifier 458 and thence through the record channel 460 to the record coil 450. At the same time a high frequency constant amplitude signal is supplied to the coil from the oscillator 452. The recording volume is controlled by the control 40 to provide a satisfactory record, as indicated by the record indicator 46. This control, as has been noted, is independent of the listening volume control which is in the playback or monitoring channel 462 from which the loudspeaker iss supplied. The treble and bass controls in this channel may be adjusted to suit the operator.

After the apparatus has been placed into operation and adjusted, the recording continues to be made and the length of the recording can be ascertained from observation of the dials 76 and 78, which indicate the playing time.

After the record has been made or at any time that it is desired to terminate the recording operation, the control knob can be turned to another position, for example, the stop position. It should be noted that the interlock does not prevent operation of the knob from the record to any of its other positions.

After the recording has been made it is assumed that it is to be reproduced. This requires the rewinding of the tape from the take-up spool to the supply spool. Consequently the knob 60 is operated into its rewind position. In this position the erase head is away from the tape; the pressure pad is away from the tape; the pinch roller is away from the capstan; the spool brake 150 is off, and the supply spool is driven in reverse direction by the driving wheel 318, the take-up spool brake is off and the spool is driven in reverse direction through the tape and against the friction of clutch 152; and the take-up spool belt tensioner is away from the belt. As a result the tape is rewound upon the supply spool at high speed. After all or a desired portion of the recorded tape has been rewound upon the supply spool the recording may be reproduced by operation of the knob to its listen position.

In the listen position of the control knob, the tape is moved at a constant speed past the record-reproduce head. In this position the erase head 132 is away from the tape, the pressure pad 104 holds the tape against the record-reproduce head, the pinch roller 92 holds the tape against the capstan, the take-up spool is driven through the flywheel, belt and clutch 152, (the take-up spool brake 188 being off), the supply spool brake 150 is on so that the spool 70 is driven by the tape against the friction applied by the brake, and the reproduce coil 520 is connected by the switch assembly 202 to the input of the amplifier 458 from whence the recorded signal is supplied through the playback channel to the loud-speaker 20, the listening volume being controllable by the control 38 and the tone being controllable by the bass and treble controls 26 and 28.

If it is desired to skip part of the recording and to reproduce a selected part of the recording, the tape can be moved at high speed in a forward direction from the supply spool to the take-up spool. All that is necessary is that the control knob 60 be in its listen position and that the fast forward speed lever 68 be moved counterclockwise whereby the normal drive of the take-up spool through the belt 166 and clutch 152 is superseded by the high speed drive of the spool through the idler 196 and the disc 186. The idler 196 moves to connect the disc 186 to the driving wheel 320 so that the take-up spool is rotated at high speed for as long a time as the high speed lever is held in its operative position.

The tape can be moved at high speed in the forward direction only in the listen position of the control. This is because of the arrangement of the high speed forward guide plate 198, especially the extension 381 thereof, with respect to the T-shaped slot 381A on the index plate permitting movement of the guide plate by lever 68 and cable 380 only in the listen position.

In order to prevent the motor from stalling when the apparatus is conditioned for high speed forward operation or for rewinding, these two drives are effected through the slip clutch 322 which, as heretofore described, slips upon the initial application of the additional load upon the motor.

When the high speed forward lever 68 iss released the brake 390 becomes effective for a brief time to prevent excessive feeding of the tape from the supply spool by the inertia of the spool. The effective period of the brake is determined by the dashpot 391.

After the high speed forward operation has been terminated, the apparatus is conditioned for the listening operation, which continues in the manner described heretofore.

From the foregoing detailed description of the construction and operation of the apparatus of the present invention, it is evident that it possesses many advantageous features and, considering the many things that it does, it is relatively simple both in construction and operation.

While the invention has been illustrated and described in connection with a recorder-reproducer, it is evident that many of the improvements are directed to different components and sub-combinations which are applicable to recorders and/or reproducers of various types as well as to apparatus other than magnetic and utilizing a tape as a recording medium. Accordingly, while the invention has been described in connection with specific details of an illustrative embodiment thereof, it should be understood that these details are not intended to be limitative of the invention, except insofar as set forth in the accompanying claims.

What is claimed as new and desired to be secured by Letters Patent of the United States is:

1. An elongated record medium driving apparatus including record medium driving means including a motor and a pair of idler wheels for driving the medium in one direction at high and low speeds, selectively operable driving means controlling means including a movable index plate upon which said motor and one of said idler wheels is mounted and movable into a predetermined position in which said motor and one wheel are drivingly connected to said driving means for moving the medium at said low speed, and second selectively operable driving means controlling means including a control member operatively connected to the other idler wheel for moving the latter drivingly to connect the motor to the driving means for moving the medium at high speed.

2. An elongated record medium driving apparatus including record medium driving means including a motor and a pair of idler wheels for driving the medium in one direction at high and low speeds, selectively operable driving means controlling means including a movable index plate upon which said motor and one of said idler wheels is mounted and movable into a predetermined position in which said motor and one wheel are drivingly connected to said driving means for moving the medium at said low speed, second selectively operable driving means controlling means including a control member operatively connected to the other idler wheel for moving the latter drivingly to connect the motor to the driving means for moving the medium at high speed, and interlock means operatively connected with said second controlling means and index plate enabling said second controlling means to be operated only in said one position of said index plate.

3. An elongated record medium driving apparatus including, multispeed record medium driving means, selectively operable multiposition control means including a movable index plate for controlling said driving means, first interlock means including a locking element in the path of movement of said index plate for preventing operation of said control means from one into another of its selective positions, manually operable means for moving said locking element out of the path of movement of said index plate thereby to render said interlock means ineffective to prevent such operation, speed changing means for said driving means, second control means controlling said speed changing means for operating the latter, and second interlock means including another locking element operatively connected with said index plate for preventing operation of said second control means in positions other than said one position.

4. In apparatus of the type including a rotatable record medium support, a two speed drive for rotating said support in one direction at low and high speeds, means including a movable control member biased to a normal position and movable to another position for changing the drive from low to high speed, support braking means including a braking element engageable with said support and a braking element support, means including a cam movable by said control member and operatively connected to said element support for rendering the braking element effective for a brief period as the control member moves from its other to its normal position, and time delay means for determining the rate of movement of said cam and thus the length of the braking period.

5. In apparatus of the type described, a rotatable record medium support, support braking means including a braking element engageable with said support and a braking element support, a manually movable control member biased to a normal position and movable to another position, means including a cam movable by said control member and operatively connected to said element support for rendering the braking element effective for a brief period during movement of the control member from its other to its normal position, and time delay means for determining the rate of movement of said cam and thus the length of the braking period.

6. In apparatus of the type described, a rotatable record medium support, support braking means including a braking element engageable with said support, a two part extensible element support and resilient means connecting said two parts, a movable control member biased to a normal position and movable to another position, means including a cam movable by said control member and engaging and adapted to move said element support for rendering the braking element effective for a brief period as the control member moves from its other to its normal position, and time delay means operatively connected to said cam for determining the length of the braking period.

7. In an elongated record medium driving apparatus, the combination including, a take-up spool drive, a supply spool drive, a capstan and cooperating pinch roller for driving the tape, a driving motor continuously energized during operation of the apparatus and driving means driven thereby, a movable support for the motor, means including an idler movably mounted on the support and a capstan driving pulley for drivingly connecting said driving means and capstan and continuously driving the latter in various positions of the support, a selective driving connection between said capstan and take-up spool drive, control means on said support for rendering said driving connection effective in a predetermined position of said support, means for drivingly connecting said driving means and supply spool drive in another position of said support, and means including a manually operable control member and driving means operable thereby for driving said take-up spool at high speed in said predetermined position and simultaneously rendering said capstan-pinch roller drive of the tape ineffective.

8. A recorder-reproducer including a take-up spool drive, a supply spool drive, a first driving wheel operatively connected to drive said take-up spool drive for driving said spool forward at slow speed and having an extension, a pair of friction type driving elements rotatably mounted on said extension, one of said pair of elements constituting part of a high speed rewind drive of the supply spool and the other part of a high speed forward drive of the take-up spool, and a clutch connecting said extension to said driving elements, said clutch being adapted to slip upon initiation of the high speed rewind or fast forward.

9. In an elongated record medium driving apparatus, the combination including a control member, a pinch roller rotatably mounted on the control member, main control means acting on said control member at a first point and movable to an operative position for moving said control member to place said pinch roller in engagement with said medium, resilient means operative in said operative position to bias said pinch roller toward said medium, and auxiliary control means acting on said control member at a second point for moving said control member relative to said main control means against the action of said biasing means to move said pinch roller away from said medium, said main control means being maintained in said operative setting when said auxiliary control means is operated thereby to place said pinch roller in engagement with said medium when said auxiliary control means is released.

10. In an elongated record medium driving apparatus, a combination including a control member, a pinch roller rotatably mounted on the control member, main control means, means mounting said control member and said main control means so that portions thereof are conjointly movable in the same direction during movement of said main control means to an operative position in which the pinch roller is moved into engagement with said medium, and auxiliary control means for moving said control member relative to said main control means to move said pinch roller away from said medium without displacing said main control means from said operative position.

11. In a magnetic transducing instrument having a capstan drive that includes a capstan for driving along a travel path an elongate magnetizeable body that is pressed against its periphery, mechanism for rotating said capstan, and an operation-selective shaft that is rotatable between first and second predetermined angularly spaced positions wherein respectively it is effective to maintain said capstan drive effective and ineffective; a mechanical system for supporting a pinch roll, maintaining it in pressure-exerting relation to said capstan periphery while said shaft is in its said first position and maintaining it spaced therefrom while said shaft is in its said second position, said system comprising a bracket positioned to the opposite side of the travel path from said capstan and supporting said pinch roll, means pivotally mounting said bracket with the axis of said pinch roll parallel to the axis of rotation of said capstan and for swinging of said pinch roll about a pivot axis disposed parallel to the other said axes, and positioning said pinch roll for movement by swinging of said bracket between first and second positions toward and away from contact with said capstan periphery, a bias spring effective between a fixed part of said instrument and said bracket to continuously urge the latter to its first position and to urge said pinch roll against the capstan periphery while said bracket is in its said first position, an actuator member pivotally mounted adjacent said bracket for swinging between a first and a second position, an extension of said actuator member angularly disposed for occupying a position spaced from said bracket while said actuator member and said bracket both are in their said first positions and during movement of said actuator device from its first to its second position to contact said bracket and move it from its first to its second position, and mechanism actuated by rotation of said shaft to move said actuator from its first to its second position.

References Cited in the file of this patent

UNITED STATES PATENTS

| | | |
|---|---|---|
| 1,431,169 | McMurtry | Oct. 10, 1922 |
| 1,465,880 | Stroh | Aug. 21, 1923 |
| 2,059,879 | Pierre | Nov. 3, 1936 |
| 2,086,130 | Hickman et al. | July 6, 1937 |
| 2,199,999 | Jensen et al. | May 7, 1940 |
| 2,255,742 | Schilling | Sept. 9, 1941 |
| 2,419,476 | Begun | Apr. 22, 1947 |
| 2,430,538 | Somers | Nov. 11, 1947 |
| 2,500,903 | Neff | Mar. 14, 1950 |
| 2,535,498 | Kornei | Dec. 26, 1950 |
| 2,537,260 | Dale | Jan. 9, 1951 |
| 2,538,893 | Begun | Jan. 23, 1951 |
| 2,555,643 | Harrison | June 5, 1951 |
| 2,540,299 | Shoup et al. | Feb. 6, 1951 |
| 2,559,770 | Johnson | July 10, 1951 |
| 2,568,790 | Collins | Sept. 25, 1951 |
| 2,623,702 | Masterson | Dec. 30, 1952 |
| 2,625,337 | Williams | Jan. 13, 1953 |
| 2,665,855 | Stone | Jan. 12, 1954 |
| 2,675,185 | Zenner | Apr. 13, 1954 |
| 2,676,212 | Williams | Apr. 20, 1954 |
| 2,668,059 | Roberts | Feb. 2, 1954 |

OTHER REFERENCES

Publication "Fiat Final Report," made public May 3, 1946, 44 pages (page 17 is relied on). (Available in Div. 16.)